United States Patent [19]

Senghaas et al.

[11] Patent Number: 4,976,146

[45] Date of Patent: Dec. 11, 1990

[54] LIQUID LEVEL MEASURING APPARATUS

[76] Inventors: Karl A. Senghaas, 434 Forrest Hill; Peter Senghaas, 334 Olney, both of San Antonio, Tex. 78209

[21] Appl. No.: 501,407

[22] Filed: Mar. 30, 1990

Related U.S. Application Data

[63] Continuation of Ser. No. 260,084, Oct. 19, 1988, abandoned.

[51] Int. Cl.$^5$ ............... G01F 23/62; G01F 23/72; H01H 35/18
[52] U.S. Cl. .................. 73/313; 73/308; 73/319; 73/DIG. 5; 200/84 C; 335/206
[58] Field of Search ............ 73/305, 308, 313, 314, 73/319, DIG. 5; 340/624; 200/84 C; 335/206, 207

[56] References Cited

U.S. PATENT DOCUMENTS

| | | | |
|---|---|---|---|
| 3,200,645 | 8/1965 | Levins | 73/313 |
| 3,224,270 | 12/1965 | Karol et al. | 73/313 |
| 3,473,381 | 10/1969 | Allen | 73/313 |
| 3,678,750 | 7/1972 | DiNoia et al. | 73/313 |
| 3,935,741 | 2/1976 | Zinsmeyer et al. | 73/313 |
| 3,976,963 | 8/1976 | Kübler | 73/313 |
| 4,056,979 | 11/1977 | Bongort et al. | 73/313 |
| 4,084,436 | 4/1978 | Smitherman | 73/313 |
| 4,102,191 | 7/1978 | Harris | 73/313 |
| 4,284,904 | 8/1981 | Tetro | 340/624 |
| 4,361,835 | 11/1982 | Nagy | 73/313 |
| 4,466,284 | 8/1984 | Dumery | 73/313 |
| 4,627,283 | 12/1986 | Nishida et al. | 73/313 |
| 4,730,491 | 3/1988 | Lew | 73/313 |
| 4,796,472 | 1/1989 | Lew | 73/313 |

FOREIGN PATENT DOCUMENTS

| | | | |
|---|---|---|---|
| 2306638 | 8/1974 | Fed. Rep. of Germany | 73/313 |
| 2604894 | 9/1976 | Fed. Rep. of Germany | 73/313 |
| 1520771 | 4/1968 | France | 73/308 |

*Primary Examiner*—William A. Cuchlinski, Jr.
*Assistant Examiner*—Diego F. F. Gutierrez
*Attorney, Agent, or Firm*—Fulbright & Jaworski

[57] ABSTRACT

A plurality of spaced reed switches vertically aligned for positioning in a liquid. Each of the reed switches vertically overlaps the adjacent above and below reed switches and the longitudinal axis of the reed switches is at an angle to the vertical. A float carries magnets and is movably positioned coaxially about the plurality of switches. An electrical indicator is connected to the switches for indicating the vertical position of the float relative to the switches.

6 Claims, 4 Drawing Sheets

LIQUID LEVEL MEASURING APPARATUS

This application is a continuation of application Ser. No. 07/260,084 filed Oct. 19, 1988 now abandoned.

BACKGROUND OF THE INVENTION

It is known to measure the level of a liquid inside of a container by the use of reed switches which are actuated by a float containing permanent magnets. For example, U.S. Pat. Nos. 3,473,381 and 3,678,750 disclose an array of magnetic reed switches which are actuated by a float for switching resistances.

The present invention is directed to an improved reed switch liquid level measuring apparatus which avoids temperature sensitive resistors and is not affected by temperature, Pressure or depth. The reed switches and magnetic field are positioned and oriented to provide an increased resolution. The apparatus provides a digital readout with a low current which makes it suitable for applications in explosive environments, and current drain is avoided between measurements.

SUMMARY

The present invention is directed to a liquid level measuring apparatus which includes a plurality of spaced reed switches vertically aligned for positioning in a liquid. For increasing the resolution of the array of switches, each reed switch vertically overlaps the adjacent above and below reed switch and the longitudinal axis of the reed switches are at an angle to the vertical. A float carrying magnetic means is movably positioned coaxially about said plurality of switches and an electrical indicating means is connected to the switches for indicating the vertical position of the float relative to the switches.

Still a further object of the present invention is wherein the reed switches vertically overlap each other approximately the distance of the vertical space between adjacent switches thereby allowing the switches to be placed closer together for increasing the resolution of the apparatus.

Yet a still further object of the present invention is wherein the vertical strength of the magnetic field of the magnetic means is effective for sequentially actuating one and then two switches as the float moves relative to the switches. This enables the apparatus to provide a resolution of one-half of the vertical spacing of the switches and thus greater resolution.

Yet a still further object of the present invention is wherein the angle to the vertical of the axis of the magnetic switches is approximately 30° (for one-quarter inch resolution) to provide an orientation to allow close spacing of the reed switches.

Still a further object of the present invention is wherein the magnetic means includes a plurality of magnets circumferentially and equally spaced in the float around the plurality of switches to provide a uniform magnetic field regardless of the rotational position of the float relative to the array of switches, or for a float with a single magnet which rides in a fluid filled tube with the reed switch array positioned outside.

Still a further object of the present invention is the provision of a second plurality of spaced reed switches similar to the first plurality of spaced reed switches, in which the second switches are positioned parallel to but vertically offset from the first plurality of switches for increasing the resolution of the measuring apparatus.

And a further object of the present invention is wherein the electrical indicating means includes a digital system including a decade interconnecting system connected to the reed switches.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
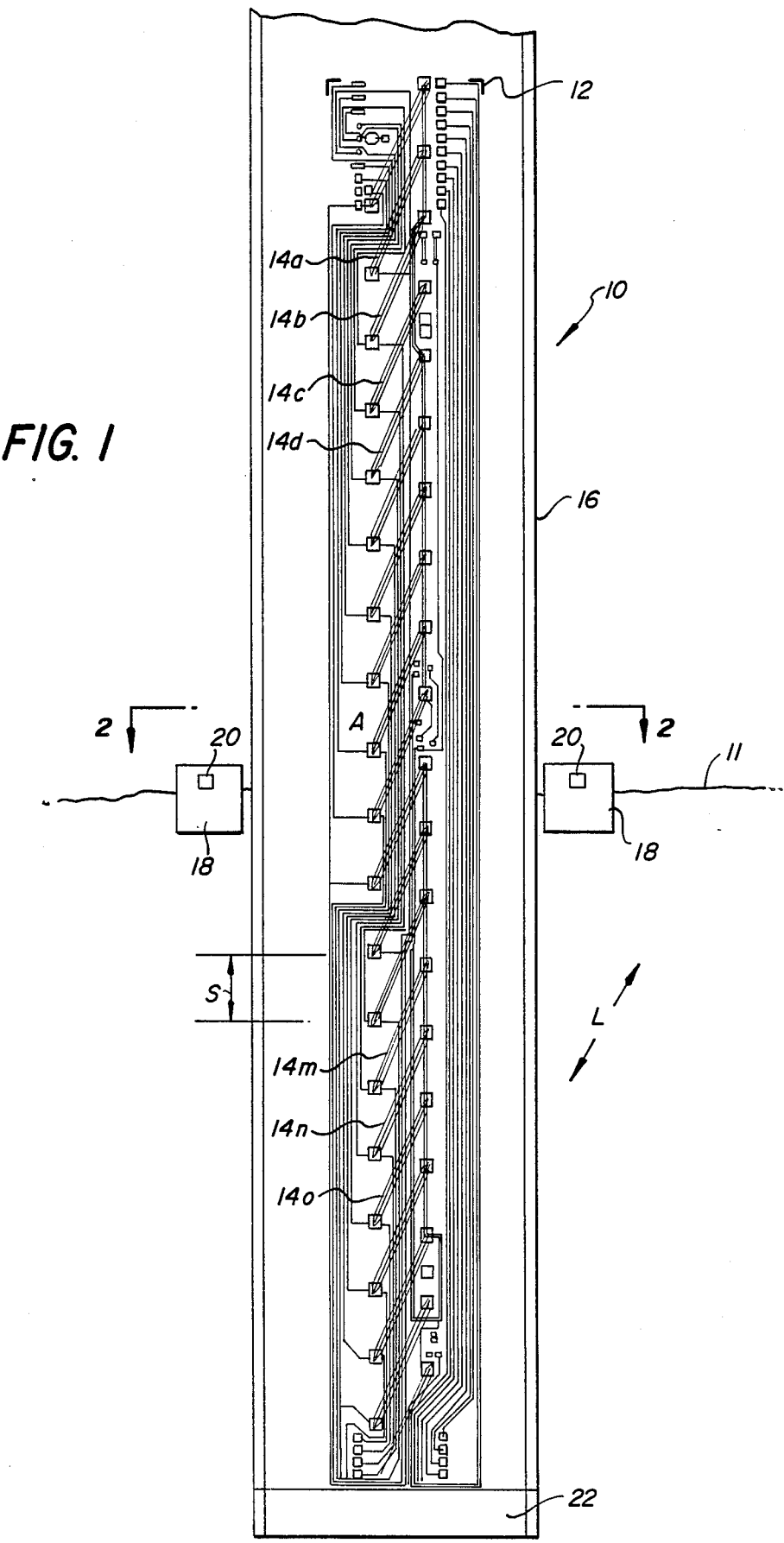
FIG. 1 is an elevational view, in cross section, of the apparatus of the present invention.

Referring now to the drawings, the reference numeral 10 generally indicates the apparatus of the present invention which is adapted to be inserted into a liquid container for measuring the level 11 of the liquid or an interface between two different liquids. The apparatus 10 includes a support, such as a printed circuit board 12, on which is positioned a plurality of spaced reed switches 14 generally indicated by the reference numeral 14 and which includes individual switches 14a et al. A non-magnetic conduit 16 such as PVC or fiberglass surrounds and protects the circuit board 12 and switches 14 from the surrounding liquid, and a float 18 movably positioned coaxially about the conduit 16 and carries magnetic means such as a plurality of permanent magnets 20. Preferably suitable means such as a weight 22 is attached to the bottom of the conduit 16 to overcome the buoyancy. A suitable electrical connection, which will be discussed hereinafter, is connected to the printed circuit board 12 and the array of reed switches 14 for connection to an indicating means to indicate the vertical position of the float 18 relative to the switches 14.

Thus, as the level 11 of the liquid changes, the float 18 will move vertically relative to the switches 14 thereby providing a readout of the level 11 of the liquid. The sensor can measure the interface of two liquids of different density by adjusting the buoyancy of the float 18 to sink in the less dense liquid and float in the more dense liquid (i.e., oil and water). Of course, if desired, a magnetic means could ride on a float in a fluid filled tube with the reed switch array positioned outside of the magnetic means.

As is conventional, the reed switches 14 consist of first and second leads which, when exposed to the same pole of an external magnetic field, are repelled to cause the switch to open, but when the leads are exposed to opposite poles of an external magnetic field the leads are attracted to each other and close the switch. An array of longitudinally vertically spaced reed switches has been used in the past for switching resistors into and out of a circuit for measuring the liquid level of a float. However, these are disadvantageous as the resistance of the resistors will vary with temperature and the accuracy of the resulting analogue measurement diminishes with sensor length. The present invention is directed to providing an apparatus which is not affected by temperature, pressure or depth by measuring only the opening or closing of the switches 14 in a digital way, maintaining design resolution regardless of measured length. Secondly, the prior art devices by being longitudinally aligned were limited in their resolution to the length of the reed switches. The present invention provides a positioning and orientation of the reed switches relative to the magnetic field of the magnets 20 to increase the resolution.

First, each reed switch vertically overlaps the adjacent above and below reed switch. Thus, reed switch 14b, while vertically spaced from reed switches 14a and 14c, has its upper and lower ends vertically overlapping reed switch 14a and 14c, respectively. The amount of overlap is dictated by the desired resolution, for a one-fourth inch resolution a one-half inch spacing is necessary with an overlap of approximately one-half inch. The advantage of the overlap is that the apparatus 10 always has a reading without any "dead" space and the resolution is increased by a factor of two from one-half inch to one-quarter of an inch. Secondly, the longitudinal axis of each reed switch 14 is at an angle A to the vertical longitudinal axis of the array of switches 14. Preferably, this angle is approximately 30°. This has the advantage of allowing the vertical spacing S between adjacent switches 14 to be reduced as will be discussed in connection with FIGS. 3A and 3B. These positional arrangements allow the effective magnetic field produced by the magnets 20 to sequentially activate one and then two of the reed switches 14 to provide a physical measurement from the apparatus 10 of precisely one-half of the switch spacing which is one-quarter of an inch.

The relationships of: (a) the length of the reed switches; (b) the spacing of the reed switches; (c) the angle of the reed switches relative to the vertical; (d) the magnetic field strength of the magnets; (e) the magnetic sensitivity of the reed switches; (f) the distance of the center line of the reed switches to the center line of the magnets; and (g) the magnetic polarity relative to the switches, are all important to the proper operation of the apparatus. As mentioned earlier, for example, using one inch reed switches, one-half inch spacing, about 20 amp-turns reed switches, one-fourth inch resolution and approximately one inch between the center line of the reed switches and the center line of the magnets; the angle of the reed switches are approximately 30° off the vertical. The angle would be different for other relationships.

The magnetic polarity of the magnets must be approximately parallel to the reed switches and the spacing of the magnets from the reed switches must be at a minimum distance such that the magnetic field closes each switch only once as the magnet passes the switch (not three times which results from closer spacing). The parallel orientation provides that the magnetic field activation (closure) of each reed switch occurs at a single defined point, not in a gradually increasing field situation which would introduce variable errors in the location of switch closure depending on the sensitivities of the individual reed switches.

Figure 2:
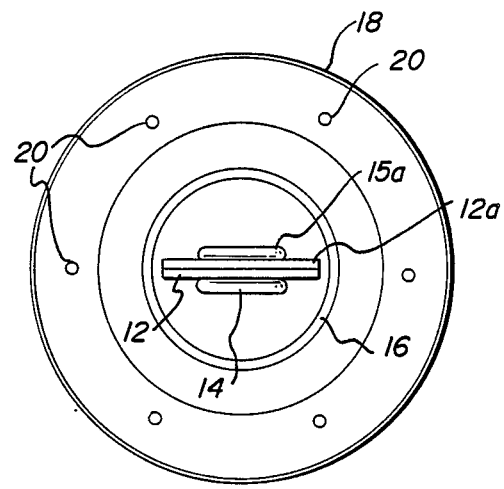
FIG. 2 is cross-sectional view, taken along the line 2—2 of FIG. 1.

Referring now to FIGS. 1 and 2, the float 18 is a circular float made out of any suitable buoyant material and contains a plurality of permanent magnets 20, preferably six or greater, to provide a uniform field encircling the switches 14. This insures that all of the switches 14 are an equal distance from the magnetic field regardless of the rotational position of the float 18 relative to the switches 14.

The strength of the magnetic field produced by the permanent magnets 20 is selected for sequentially actuating one and then two switches 14 as the float moves relative to the switches. This sequence continues with the magnetic field sequentially activating one and two switches 14. The relationship between the magnetic field of the magnets 20 and the particular positioning of the reed switches 14 produces the greatest measuring resolution of the apparatus 10.

Figure 3A:
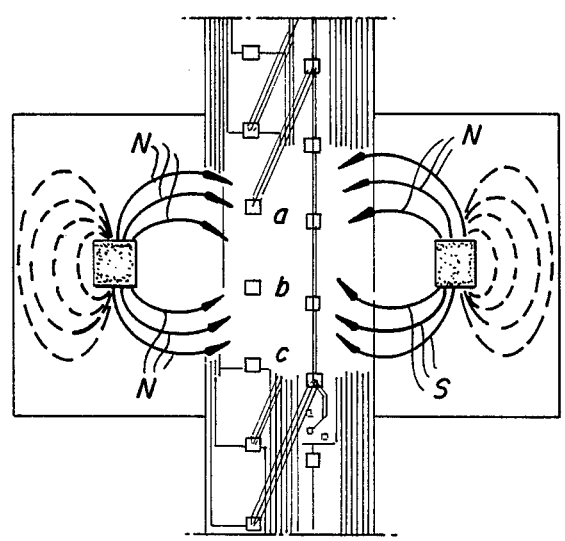
FIG. 3A is a fragmentary, elevational schematic illustrating the operation of the present apparatus with the magnetic field in one position relative to the reed switches.
Figure 3B:
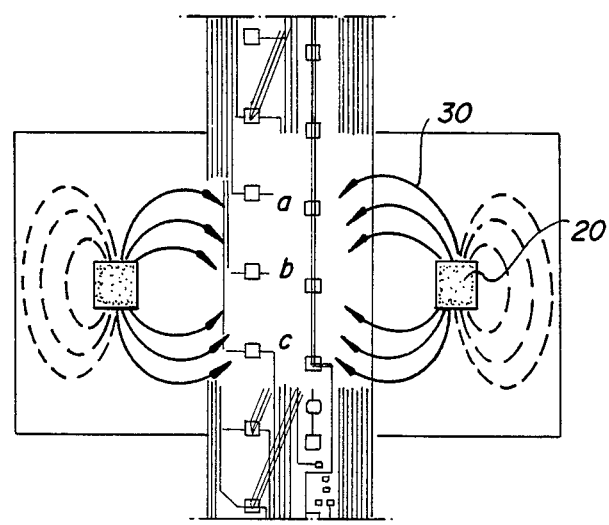
FIG. 3B is a view similar to FIG. 3A with the magnetic field at a different relative position to the reed switches.

Referring now to FIG. 3B, the relationship of the magnetic field 30 produced by the magnets 20 has been selected so that reed switch b is on since its ends are subjected to different magnetic poles of the magnets 20. However, switches a and c are off since both of their leads are subject to the same magnetic field of the magnets 20. Of course, any other reed switches above or below the switches a, b and c are in the off position since they are all subject to a single polarity magnetic field or are in a weak field. While N and S designations have been shown for the magnetic field, the orientation of the magnets may be reversed.

Referring now to FIG. 3A switches a and b are on and all of the other switches are off. This position occurs where the magnets 20 are positioned approximately midway between the lower end of switch a and the upper end of switch b.

Therefore, with the selection of the desired magnetic field strength to activate sequentially one and then two of the switches 14, the apparatus 10 provides a resolution of one-half of the physical spacing S of the switches. That is, the magnetic field strength of the magnets 20 is selected to actuate at least two of the magnetic switches but not three of the magnetic switches 14 at the same time.

Thus in the numerical example given above, every "single" switch closure represents a one-half inch step while a two-switch closure represents the distance half way between the half-inch steps for a combined resolution of a quarter-inch.

Referring again to FIG. 2, a second printed circuit board 12a and a second array of reed switches 15a are provided in which the array 15a is identical to that shown in FIG. 1 for the switches 14. However, the printed circuit board and array of switches 15a is longitudinally offset from the first printed circuit board 12 and switches 14 for increasing the resolution of the measuring apparatus 10. That is, in the numerical example given, the second printed circuit board 12a is longitudinally offset one-eighth of an inch relative to the first printed circuit board 12 to increase the combined resolution of the apparatus 10 to one-eighth of an inch.

In addition, additional lengths of printed circuit boards 12 and switches 14 may be used to be interconnected together to allow the apparatus 10 to measuring over any depth required.

Figure 4:
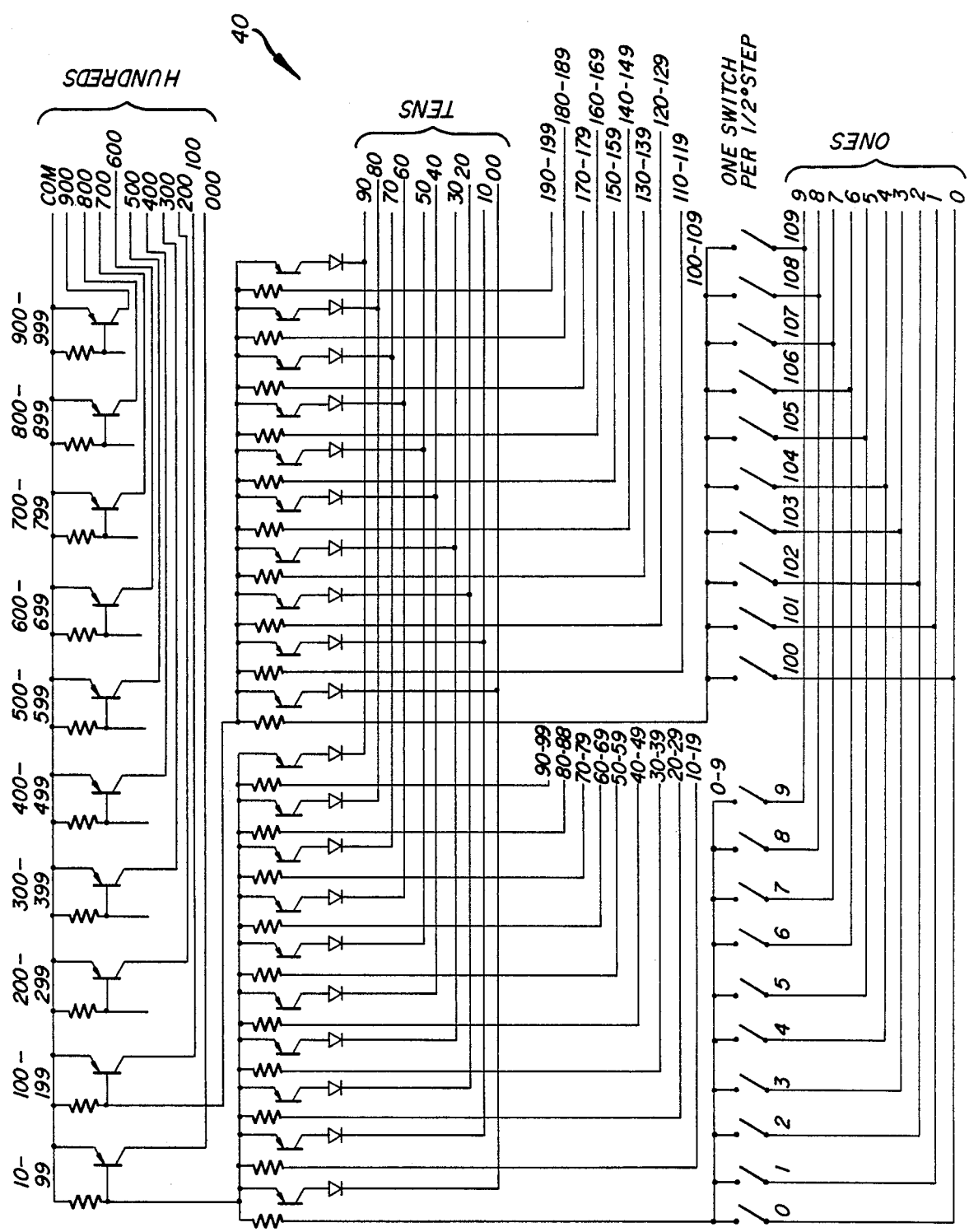
FIG. 4 is an electrical schematic of a decade interconnecting system for connection to the reed switches.

The present invention avoids the use of measuring resistors, used in the prior art, which are subject to temperature variations. Instead, the present invention provides a digital readout of whether the reed switches 14 are opened and closed by an interconnecting circuit connected on the printed circuit board 12 with a minimum of wiring connections. On the one hand, it is desirable that the number of electrical lines required to interface with each of the reed switches 14 should be minimized. This should be done by also reducing the number of electrical components required to be connected in the interconnecting circuit on the printed circuit board 12. Referring to FIG. 4, a balance of required interface wiring and the number of electrical components required on the board 12 is achieved by a decade interconnecting system generally indicated by the reference numeral 40. Here the reed switches are in numerical order, wired together by connecting all of the units, resulting in ten wires, and connecting all of the tens resulting in another ten wires, and connecting all of the hundreds resulting in ten wires for an apparatus with 1000 measuring positions. Thus, a total of 31 wires (including one common) can identify any discrete switch closure on a 1000 reed switch level sensor 10. Using a three tier solid state sensing matrix will require only a single diode and transistor for each set of ten and set of 100 switches to be placed on the printed circuit board 12.

Figure 5:
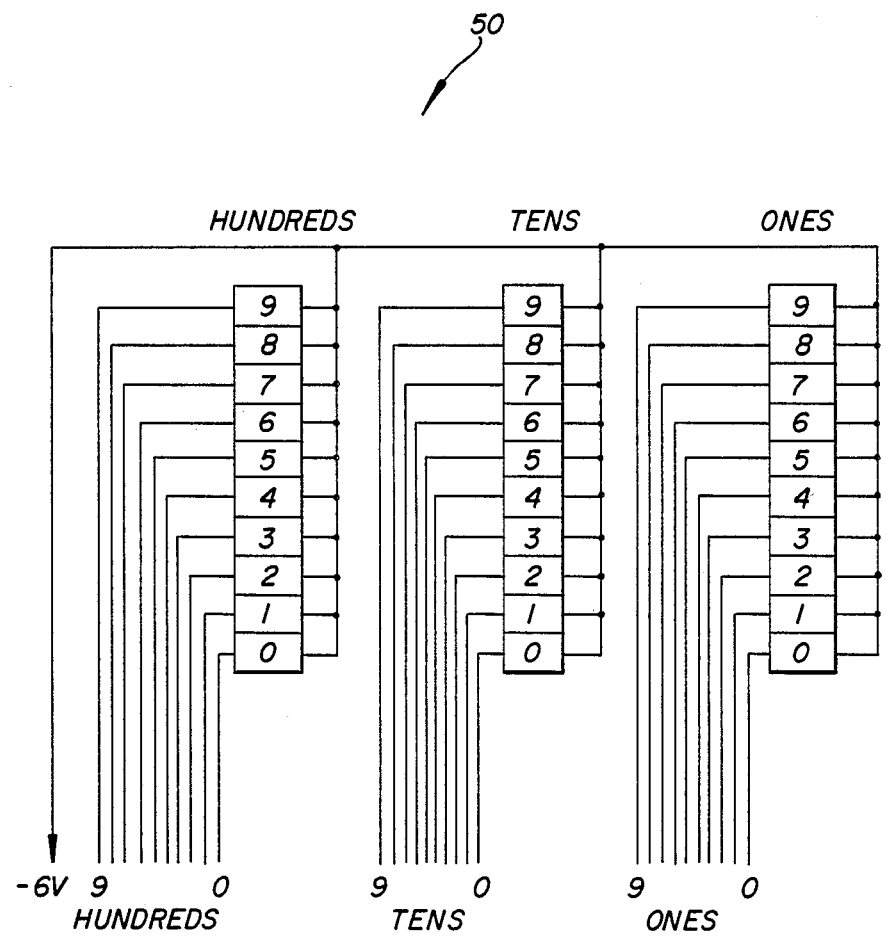
FIG. 5 is a schematic of one type of indicating apparatus.

Referring to FIG. 5, a low cost bar graph display 50 is shown for a 1000 switch sensor from FIG. 4. The 31 wires required are connected to the three column bar graph display. An up and down motion by the float 18 is precisely indicated on the bar graph 50 and can be easily interpreted into measurement steps. However, it may be preferable to provide an external connection instead of the bar graph 50 which includes a microprocessor control interface which translates the decimal code of the sensor 10 directly into engineering units and which is capable of directly driving an LED display and a printer.

Other advantages of the present apparatus 10 is that it inherently uses a low current, for example, less than 20 milliamps which makes it suitable for inherently safe applications in explosive environments such as measuring the level of petroleum products. Furthermore, no current drain takes place between measuring periods and the sensor 10 can be intermittently powered and still measure the float's exact position.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A liquid level measuring apparatus comprising:
    a plurality of spaced reed switches vertically aligned for positioning in a liquid, each reed switch vertically overlapping the adjacent above and below reed switches, the longitudinal axis of said reed switches being at an angle to the vertical,
    a float carrying magnetic means movably positioned coaxially about said plurality of switches, the magnetic polarity of said magnetic means being vertically aligned, the magnetic means having a magnetic field in which the vertical strength is effective for sequentially and alternately actuating only one and then two switches as the float movers relative to the switches without actuating any other switches, said magnetic field is oriented relative to the reed switches and at a distance from the switches to provide a single defined actuation of each switch as the magnetic means moves relative to the switches,
    a digital driver circuit connected to each reed switch, and
    electrical indicating means, connected to said digital driver circuits, for indicating a vertical position of the float relative to said switches,
    wherein said reed switches, said magnetic means and said indicating means are configured so that said indicating means has a resolution corresponding to a half of the distance between said spaced reed switches.

2. The apparatus of claim 1 wherein the reed switches vertical overlap each other approximately the distance of the vertical space between adjacent switches.

3. The apparatus of claim 1 wherein the angle to the vertical of the axis of the switches is approximately thirty degrees.

4. The apparatus of claim 1 wherein the magnetic means includes a plurality of magnets circumferentially and equally spaced in the float around the plurality of switches.

5. The apparatus of claim 1 including,
    a second plurality of spaced reed switches similar to said first plurality of spaced reed switches, said second switches positioned parallel to but vertically offset from the first plurality of switches for increasing the resolution of the measuring apparatus.

6. The apparatus of claim 1 wherein the electrical indicating means includes,
    a digital system including a decade interconnecting system connected to said reed switches.

* * * * *